3,274,211
N-ALKYLATION OF AMIDES AND IMIDES
Louis Schmerling, Riverside, Ill., assignor to Universal Oil Products Company, Des Plaines, Ill., a corporation of Delaware
No Drawing. Filed Feb. 4, 1964, Ser. No. 342,549
9 Claims. (Cl. 260—326)

This invention relates to a novel process for the N-alkylation of carboxylic acid amides and imides. More particularly, this invention relates to the reductive alkylation of carboxylic acid amides and imides to give N-alkylation products.

The alkylation products herein contemplated are particularly adapted to the preparation of primary amines. For example, N-isobutylacetamide, the reductive alkylation product of acetamide and isobutyraldehyde, is hydrolyzed to isobutylamine and acetic acid, the latter being readily converted to the acetamide starting material by reaction with ammonia. Similarly, N-isopropylphthalimide, the reductive alkylation product of phthalimide and acetone, can be hydrolyzed to isopropylamine and phthalic acid and the latter may be reacted with ammonia to form the phthalimide starting material.

It is an object of this invention to disclose a novel process for preparing N-alkylated carboxylic acid amides and imides. In one of its broad aspects, this invention embodies a process for the N-alkylation of a compound selected from the group consisting of amides and imides which comprises reacting said compound with a carbonyl compound selected from the group consisting of aldehydes and ketones at a hydrogen pressure of from about atmospheric to about 100 atmospheres and at a temperature of from about 60° C. to about 250° C. in the presence of a reductive alkylation catalyst under acidic reaction conditions.

A more specific embodiment of this invention is in a process which comprises reacting phthalimide with acetone at a hydrogen pressure of from about 10 atmospheres to about 100 atmospheres and at a temperature of from about 150° C. to about 180° C. in the presence of a reductive alkylation catalyst under acidic reaction conditions and forming the N-alkylation product, N-isopropylphthalimide.

Another of the more specific embodiments of this invention relates to a process which comprises reacting acetamide with isobutyraldehyde at a hydrogen pressure of from about 10 atmospheres to about 100 atmospheres and at a temperature of from about 150° C. to about 180° C. in the presence of a reductive alkylation catalyst under acidic reaction conditions and forming N-isobutylacetamide.

Other objects and embodiments of this invention will become apparent in the following detailed specification.

The process of this invention is applicable to the N-alkylation of the amide and imide derivatives of saturated carboxylic acids in general; for example, the amide derivative of acetic acid, acetamide, and the corresponding imide derivative, acetimide, sometimes referred to as di-acylamide. Other suitable amides and imides include formamide, propionamide, n-butyramide, n-valeramide, n-caproamide, stearamide, carbamide, succinamide, glutaramide, phthalamide, phthalimide, naphthalamide, naphthalimide, succinimide, glutarimide, benzamide, acetanilide, benzanilide, and the like.

N-alkylation is effected utilizing a carbonyl compound, which can be a ketone or an aldehyde, as an alkylating agent. Any suitable ketone or aldehyde may be employed. For example, where the desired N-alkylation product is N-isopropylsuccinimide, acetone is a suitable alkylating agent and may be reacted with succinimide according to the process of this invention. Other ketones which may be utilized to give particular N-alkylation products include methyl ethyl ketone, methyl propyl ketone, methyl butyl ketone, methyl amyl ketone, methyl hexyl ketone, methyl heptyl ketone, methyl octyl ketone, etc., ethyl ethyl ketone, ethyl propyl ketone, ethyl butyl ketone, ethyl amyl ketone, ethyl hexyl ketone, ethyl heptyl ketone, etc., propyl propyl ketone, propyl butyl ketone, propyl amyl ketone, propyl hexyl ketone, etc., butyl butyl ketone, butyl amyl ketone, butyl hexyl ketone, etc. Other suitable but not necessarily equivalent ketones comprise cyclic ketones including cyclohexanone, benzophenone, etc., alkyl aryl ketones, alkyl cyclohexyl ketones, aryl aryl ketones, aryl cyclohexyl ketones, etc., including compounds like acetophenone, ethyl phenyl ketone, propyl phenyl ketone, butyl phenyl ketone, amyl phenyl ketone, etc., methyl cyclohexyl ketone, ethyl cyclohexyl ketone, propyl cyclohexyl ketone, butyl cyclohexyl ketone, etc. Suitable aldehydes include formaldehyde, acetaldehyde, propionaldehyde, butyraldehyde, valeraldehyde, etc. It is understood that the particular aldehyde or ketone employed is dependent on the particular product desired.

The reductive alkylation reaction requires at least one mole of hydrogen per mole of amide or imide being treated. In general, it is preferable to operate with at least a slight molar excess of hydrogen over the stoichiometric requirement. This is generally accomplished by conducting the reaction at a hydrogen pressure of from about atmospheric to about 100 atmospheres or more, and preferably at a hydrogen pressure of from about 10 to about 100 atmospheres. Suitable reaction temperatures are within the range of from about 60° C. to about 250° C., more preferably in the range of from about 150° C. to about 180° C., the optimum temperature in any particular case being dependent in part on the particular reactants involved and the catalyst employed. Any suitable reductive alkylation catalyst can be used, and may comprise a composite containing platinum, palladium, nickel, cobalt, molybdenum, etc., or mixtures thereof with a suitable carrier material including alumina, silica, zirconia, titania, thoria, zinc oxide, or mixtures thereof, or the naturally occurring bauxite, kaolin or bentonite clay, or diatomaceous earth such as kieselguhr, montmorillonite, etc.

It has been found that acidic reaction conditions greatly enhance the reductive alkylation reaction herein contemplated. When the reaction is effected under substantially neutral conditions, the reaction does not proceed to any appreciable extent. However, the inclusion of an acidic material in the reaction mixture results in a substantial increase in the desired N-alkylation product and by-product formation is substantially if not completely eliminated. In most cases the imides, which are themselves considered weak acids, impart sufficient acidity to the reaction mixture. On the other hand, reductive alkylation of the substantially neutral amides requires the inclusion of an added acidic material in the reaction mixture. Weak acids such as boric acid, acetic acid, and the like, which are substantially inactive with respect to the reactants at reaction conditions, may be suitably included in the reaction mixture to impart the desired acidic reaction conditions thereto.

The process of this invention is suitably carried out in a batch type of operation utilizing an autoclave, preferably a high pressure autoclave, provided with adequate heating and mixing means. Experiments relating to the present invention were suitably carried out in a glass-lined rotating autoclave. A carboxylic acid amide or imide, as the case may be, is sealed in the autoclave together with a suitable aldehyde or ketone, the selected reductive alkylation catalyst, and an acidic material. The autoclave is then pressured with hydrogen and heated at the described reaction conditions for a predetermined residence time, say from about 1 to about 12 hours or more. Since hydrogen is consumed in the reductive alkylation reaction, the extent of the reaction can be ascertained with reference to pressure. The reductive alkylation product can be recovered from the reaction mixture by conventional methods. One suitable method is by solvent extraction utilizing acetone and methanol.

In a continuous type process, the catalyst is deposited in a reaction zone and the reactants, at the proper temperature, are introduced into the reaction zone in admixture with hydrogen in either upward or downward flow. The effluent products from the reaction zone are subjected to fractionation or other suitable means to separate the desired products. Unreacted starting materials and excess hydrogen are recovered and recycled as a portion of the reactor feed.

The following examples are presented in further illustration of the process of this invention. It is not intended that the said examples be interpreted as an undue limitation on the generally broad scope of this invention.

Example I

A mixture of 51 grams of phthalimide, 100 grams of acetone and 20 grams of alumina-platinum catalyst containing about .04% platinum was charged to a glass liner and sealed in a rotating autoclave of 850 cc. capacity. The autoclave was pressured to about 100 atm. with hydrogen and then heated at 160° C. for 12 hours. The final pressure at room temperature was 51 atm. N-isopropylphthalimide (M.P. 75–78° C.) was recovered in about a 25% yield from unreacted phthalimide and acetone on the basis of its greater solubility in methanol and acetone. The structure of the reductive alkylation product was confirmed by nuclear magnetic resonance analysis.

Example II

The reductive alkylation of succinimide to form N-isobutylsuccinimide is effected by heating about 100 grams of succinimide and 70 grams of isobutyraldehyde with 8 grams of nickel-kieselguhr catalyst in a glass liner of a rotating autoclave in a hydrogen atmosphere. The reaction is effected at an initial hydrogen pressure of about 100 atm. and at a temperature of 150–160° C. over a 12 hour period. The nickel-kieselguhr catalyst comprises about 60% nickel, calculated as nickel oxide, composited with kieselguhr.

Example III

A mixture of 60 grams of acetamide, 70 grams of isobutyraldehyde, 15 grams of alumina-platinum catalyst containing about .04% platinum, and 35 grams of boric acid was charged to a glass liner and sealed in a rotating autoclave of 850 cc. capacity. The autoclave was pressured to about 100 atm. with hydrogen and then heated at 160° C. for 12 hours. The final pressure at room temperature was 70 atm. N-isobutylacetamide was recovered in about a 20% yield. There was relatively little side reaction other than perhaps the formation of a small amount of N,N-diisobutylacetamide.

Example IV

When a mixture of 100 grams of acetamide, 75 grams of isobutyraldehyde and 15 grams of alumina-platinum catalyst containing about .04% platinum, was heated for 12 hours at a temperature of 160° C. and an initial hydrogen pressure of about 100 atm. in the absence of added acid, the desired N-isobutylacetamine was obtained in only a 4% yield. The major product, obtained in about 49% yield, was triisobutylamine.

Example V

A mixture of 61 grams of acetamide, 71 grams of isobutyraldehyde, 15 grams of alumina-platinum catalyst containing about .04% platinum, and 50 grams of acetic acid was charged to a glass liner and sealed in a rotating autoclave. The autoclave was pressured to about 100 atm. with hydrogen and heated at 160° C. for 12 hours. The final pressure was 50 atm. In this case the reductive alkylation product consisted of a mixture of N-isobutylacetamide and N,N-diisobutylacetamide.

I claim as my invention:

1. A process for the N-alkylation of a compound selected from the group consisting of amides and imides containing only the one functional group and having a hydrogen atom attached to the nitrogen atom which comprises reacting said compound with a carbonyl compound selected from the group consisting of aldehydes and ketones in which carbonyl is the only functional group at a hydrogen pressure of from about atmospheric to about 100 atmospheres and at a temperature of from about 60° C. to about 250° C. under acidic reaction conditions and in the presence of a platinum catalyst.

2. The process of claim 1 further characterized in that said catalyst is an alumina-platinum composite.

3. A process for the N-alkylation of a noncyclic amide containing only the one functional group and having a hydrogen atom attached to the nitrogen atom which comprises reacting said amide with a ketone or aldehyde in which carbonyl is the only functional group at a hydrogen pressure of from about atmospheric to about 100 atmospheres at a temperature of from about 60° C. to about 250° C. in the presence of a platinum catalyst under acidic reaction conditions.

4. A process for the N-alkylation of an imide containing only the one functional group and having a hydrogen atom attached to the nitrogen atom which comprises reacting said imide with a ketone or aldehyde in which carbonyl is the only functional group at a hydrogen pressure of from about atmospheric to about 100 atmospheres and at a temperature of from about 60° C. to about 250° C. in the presence of a platinum catalyst under acidic reaction conditions.

5. A process for the N-alkylation of a noncyclic amide containing only the one functional group and having a hydrogen atom attached to the nitrogen atom which comprises reacting said amide with a ketone or aldehyde in which carbonyl is the only functional group at a hydrogen pressure of from about atmospheric to about 100 atmospheres and at a temperature of from about 150° C. to about 180° C. in the presence of a platinum catalyst under acidic reaction conditions.

6. A process for the N-alkylation of an imide containing only the one functional group and having a hydrogen atom attached to the nitrogen atom which comprises reacting said imide with a ketone or aldehyde in which carbonyl is the only functional group at a hydrogen pressure of from about atmospheric to about 100 atmospheres and at a temperature of from about 150° C. to about 180° C. in the presence of a platinum catalyst under acidic reaction conditions.

7. A process which comprises reacting phthalimide with acetone at a hydrogen pressure of from about 10 atmospheres to about 100 atmospheres and at a temperature of from about 150° C. to about 180° C. in the presence of a platinum catalyst under acidic reaction conditions and forming N-isopropylphthalimide.

8. A process which comprises reacting succinimide with isobutyraldehyde at a hydrogen pressure of from about 10 atmospheres to about 100 atmospheres and at a temperature of from about 150° C. to about 180° C. in the presence of a platinum catalyst under acidic reaction conditions and forming N-isobutylsuccinimide.

9. A process which comprises reacting acetamide with isobutyraldehyde at a hydrogen pressure of from about 10 atmospheres to about 100 atmospheres and at a temperature of from about 150° C. to about 180° C. in the presence of a platinum catalyst under acidic reaction conditions and forming N-isobutylacetamide.

(References on following page)

References Cited by the Examiner

UNITED STATES PATENTS 2,947,784  8/1960  Martin et al. _____ 260—577

OTHER REFERENCES

Degering, An outline of Organic Nitrogen Compounds, University Lithoprinters, 1950, pages 405 and 488.

Sekiya, Jour. Pharm. Soc. of Japan, volume 70, 1950, pp. 520–24.

Weissberger, Ed., Technique of Organic Chemistry, vol. II, Interscience Publishers, Inc., New York, 1956, pp. 146–148.

ALEX MAZEL, *Primary Examiner.*

MARY U. O'BRIEN, *Assistant Examiner.*